US011699032B2

(12) United States Patent
Shirolkar et al.

(10) Patent No.: US 11,699,032 B2
(45) Date of Patent: Jul. 11, 2023

(54) DATA SET LOOKUP WITH BINARY SEARCH INTEGRATION AND CACHING

(71) Applicant: Microsoft Technology Licensing, LLC, Redmond, WA (US)

(72) Inventors: Prashant Anand Shirolkar, Kirkland, WA (US); George Randell Dong, Sammamish, WA (US); Henry Nathan Shomber, Redmond, WA (US); Jeffrey James Duzak, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 77 days.

(21) Appl. No.: 15/803,228

(22) Filed: Nov. 3, 2017

(65) Prior Publication Data

US 2019/0138590 A1 May 9, 2019

(51) Int. Cl.
*G06F 40/18* (2020.01)
*G06F 16/2455* (2019.01)
*G06F 16/22* (2019.01)

(52) U.S. Cl.
CPC .......... *G06F 40/18* (2020.01); *G06F 16/2228* (2019.01); *G06F 16/24552* (2019.01)

(58) Field of Classification Search
CPC ............. G06F 40/18; G06F 16/24552; G06F 16/2228; G06F 17/246; G06F 17/30321
See application file for complete search history.

(56) References Cited

U.S. PATENT DOCUMENTS

| 7,171,424 B2* | 1/2007 | Barsness ........... G06F 17/30554 707/723 |
| 7,917,549 B2* | 3/2011 | Arazi ................ G06F 17/30392 707/805 |
| 2003/0158850 A1* | 8/2003 | Lawrence ......... G06F 17/30616 |
| 2007/0061698 A1* | 3/2007 | Megiddo ............ G06F 17/2247 715/210 |

(Continued)

FOREIGN PATENT DOCUMENTS

EP  1164502 A2  12/2001

OTHER PUBLICATIONS

"Excel formula to check and see if a column is ascending order," <https://stackoverflow.com/questions/32125526/excel-formula-to-check-and-see-if-a-column-is-in-ascending-order>, Aug. 20, 2015, pp. 1-2. (Year: 2015).*

(Continued)

*Primary Examiner* — Kyle R Stork

(57) ABSTRACT

In non-limiting examples of the present disclosure, systems, methods and devices for identifying a target value in a data set are presented. A request for a first target value in a data array may be received, wherein the request comprises first reference value. The data array may comprise a plurality of values and a plurality of value types included in one or more tables in a computer-implemented spreadsheet application. An index comprising a plurality of sorted reference numbers corresponding to a plurality of values in the data array may be generated based on the request. The index may be searched, and based at least on the search, the first reference value may be identified. In additional examples, the index may be cached and utilized to process additional target value requests that reference an overlapping range value with the first request.

20 Claims, 10 Drawing Sheets

(56) References Cited

U.S. PATENT DOCUMENTS

| | | | |
|---|---|---|---|
| 2007/0112795 | A1 | 5/2007 | Travison et al. |
| 2008/0294676 | A1* | 11/2008 | Faerber .................. H03M 7/30 |
| 2009/0313287 | A1* | 12/2009 | Koralski ................. G06F 40/18 |
| 2010/0228580 | A1* | 9/2010 | Zoldi ..................... G06Q 10/10 705/38 |
| 2013/0013994 | A1 | 1/2013 | Handsaker et al. |
| 2013/0080298 | A1* | 3/2013 | Latulipe ................. G06Q 40/00 705/30 |
| 2014/0250090 | A1 | 9/2014 | Faerber et al. |
| 2020/0050699 | A1* | 2/2020 | Hua .................... G06F 16/9038 |

OTHER PUBLICATIONS

"Python—Binary Search of an unsorted list—Stack Overflow," <https://web.archive.org/web/20170210092431/https://stackoverflow.com/questions/33713643/binary-search-of-an-unsorted-list>, 2017, pp. 1-2. (Year: 2017).*

Excel Off The Grid, "Excel formula to check if a list is sorted," <https://excelloffthegrid.com/excel-formulat-to-check-if-a-list-is-sorted/>, Oct. 9, 2017, pp. 1-9. (Year: 2017).*

Frolov, Alexander, "How to sort Excel data by column names, by row and in custom order," <https://web.archive.org/web/20131001045448/https://www.ablebits.com/office-addins-blog/2013/09/04/excel-sort-column-row-custom-list/>, 2013, pp. 1-8. (Year: 2013).*

"Summons to attend oral proceedings in European Patent Application 1880382.7," Mailed Date: Jun. 17, 2022, pp. 1-2. (Year: 2022).*

"Summons to attend oral proceedings in European Patent Application 1880382.7," Mailed Date: May 30, 2022, pp. 1-2. (Year: 2022).*

"Intent to grant in European Patent Application 1880382.7," dated May 12, 2022, pp. 1-8. (Year: 2022).*

"[Tutorial] VLOOKUP questions and answers", Retrieved from: https://web.archive.org/web/20130913235923/http://forum.openoffice.org:80/en/forum/viewtopic.php?t=46746, Sep. 13, 2013, 07 Pages.

"Binary search algorithm", Retrieved from: https://en.wikipedia.org/w/index.php?title=Binary_search_algorithm&oldid=807896980, Oct. 30, 2017, 12 Pages.

"Binary Searches With VLOOKUP", Retrieved from: https://colinlegg.wordpress.com/2012/03/25/binary-searches-with-vlookup/, Mar. 25, 2012, 07 Pages.

"Lookup table", Retrieved from: https://en.wikipedia org/w/index.php?title=Lookup_table&oldid=805781280, Oct. 17, 2017, 07 Pages.

"Lookups—understanding the binary search algorithm", Retrieved from: http://excelevolution.com/lookups-understanding-the-binary-search-algorithm/, Aug. 1, 2016, 12 Pages.

"International Search Report and Written Opinion Issued in PCT Application No. PCT/US18/057902", dated Jan. 30, 2019, 13 Pages.

"Office Action Issued in European Patent Application No. 18803832.7", dated Dec. 17, 2021, 9 Pages.

"Notice of Allowance Issued in European Patent Application No. 18803832.7", dated Dec. 5, 2022, 8 Pages.

"Decision to Grant Issued in European Patent Application No. 18803832.7", dated Mar. 23, 2023, 2 Pages.

* cited by examiner

FIG. 2

| | A | B | C | D | E |
|---|---|---|---|---|---|
| 1 | Movie | Year | Month | Rank | Sales |
| 2 | Alpha | 2001 | Dec. | 4 | $1,258,127,200.00 |
| 3 | Beta | 1987 | Mar. | 675 | $22,248,500.00 |
| 4 | Charlie | 1992 | Jul. | 52 | $700,921,400.00 |
| 5 | Delta | 2010 | Jul. | 198 | $127,892,600.00 |
| 6 | Echo | 2017 | Sept. | 327 | $48,267,300.00 |
| 7 | Foxtrot | 1979 | Nov. | 225 | $92,222,200.00 |
| 8 | Gamma | 1984 | Jan. | 47 | $725,339,100.00 |
| 9 | Hector | 2015 | May | 496 | $37,843,600.00 |

I4: =VLOOKUP(I3,D2:E9,2,FALSE)

Rank: 327
Sales: $48,267,300.00

DATA SET LOOKUP WITH BINARY SEARCH INTEGRATION AND CACHING

BACKGROUND

Businesses and individual users utilize spreadsheets and other computer-implemented table applications to store and organize a wide variety of data. Such applications are useful in organizing data and in some cases those applications may provide mechanisms for sorting and finding specified data utilizing various functions supported by the applications. However, lookup functions, such as VLOOKUP, MATCH and HLOOKUP, that are utilized in spreadsheet applications can be expensive from a processing standpoint if the data in a given spreadsheet that is applying a lookup function is sorted by a value type (e.g., number, text, logical value, etc.) that does not correspond to a value type that is included as a reference in the lookup function.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for identifying a target value in a data set. In some examples, a determination is made regarding whether a data set is sorted according to a particular value type designated in a target value request (e.g., a VLOOKUP function, an HLOOKUP function, a MATCH function). If a determination is made that the data set is not sorted according to reference value type included in the request, a determination may be made as to whether a cached index comprising row or column numbers that are sorted based on the reference value type designated in the target value request exists. If a determination is made that no such cached index exists, a new sorted index may be generated, and a fast search may be utilized to determine the target value. If a determination is made that a cached index does exist, and that cached index corresponds to the range specified in the target value request, the identified cached index may be utilized to perform a fast search to determine the target value. Intermediary values obtained from a cached index may be applied to a plurality of lookup functions that rely on one or more same values that have already been sorted in creating a cached index.

BRIEF DESCRIPTION OF THE DRAWINGS

Non-limiting and non-exhaustive examples are described with reference to the following figures:

FIG. 2 illustrates an exemplary lookup function in a spreadsheet application that may utilize the fast search mechanisms described herein for identifying one or more target values in the spreadsheet application.

DETAILED DESCRIPTION

Figure 1:
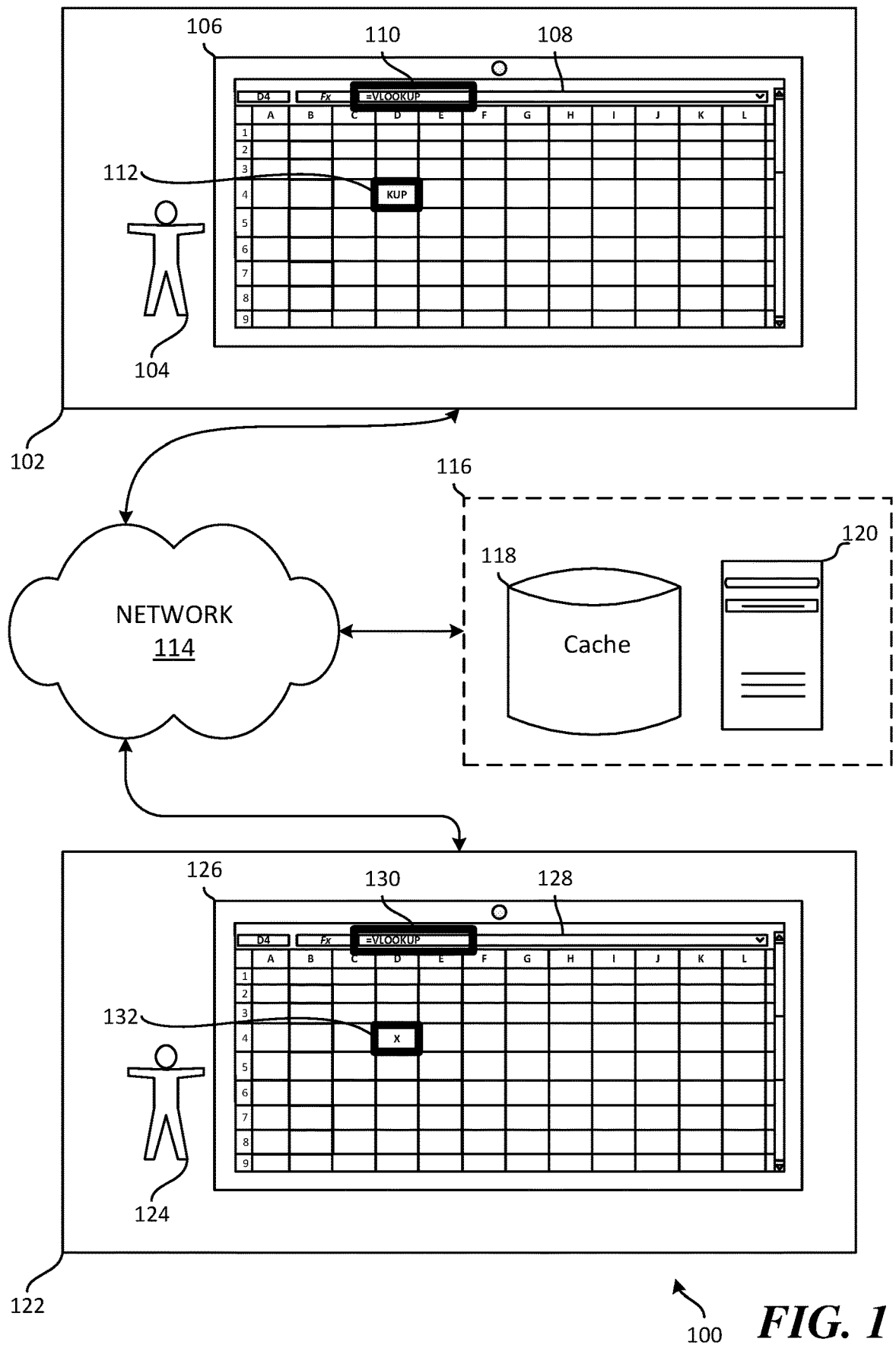
FIG. 1 is a schematic diagram illustrating an example distributed computing environment for performing a fast search to identify one or more target values in a spreadsheet application.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The various embodiments and examples described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the claims.

Generally, the present disclosure is directed to systems, methods and devices for performing fast searches (e.g., binary searches, hash function searches, radix sort searches, etc.) for target values in a data set. Lookup functions, such as VLOOKUP, MATCH and HLOOKUP, allow users of spreadsheet applications to identify a value, or a location of a value, in a spreadsheet data set that they do not know, but for which they know a different value related to that value. For example, if a spreadsheet application data set includes a list of persons, with identifying values for each person of a last name and a social security number, a spreadsheet application user may utilize a lookup function that includes a value that they do know (i.e., a reference value), such as the last name of a particular user, to identify a piece of information, or target value, that they do not know, such as the person's social security number. In some scenarios, the range that is specified in the lookup function may overlap with other spreadsheet application functions applied to a set of data. However, in cases where the information in a data set is sorted according to a value type that does not correspond to the reference value, in applying the lookup function the spreadsheet application must go through each value in the specified range systematically until the reference value is identified or not found in the range.

Where more than one lookup function applied to a data set utilizes a same portion of a range, the computing costs associated with performing the lookup functions have typically been compounded because as each of the functions are processed, the processing computing device must perform a systematic analysis of each unsorted value corresponding to each function's range until the reference value of each function is identified or not identified. That is, if a first lookup function is processed with reference X in range of cells A1:A10000, and reference X is in cell A800, the processing computing device must analyze 800 cells (cells A1 to A800) to determine if there is a matching X reference value in each of the first 800 cells. Likewise, if a second lookup function is processed for the same set of data in the spreadsheet, and that function is looking for reference value Y in the same range of cells (A1:A10000), and reference value Y is in cell 900, the processing computing device must analyze the first 800 cells during the processing of the first function, as well as re-analyzing those first 800 cells, in addition to cells A801 to A900 during the processing of the second function. Thus, for data sets that include a large number of lookup functions that have overlapping ranges and/or a plurality of lookup functions that share a large number of overlapping ranges, the processing costs and time necessary to accomplish the processing of those functions has typically been intensive.

Aspects described herein provide mechanisms for decreasing processing costs (e.g., computer processing cycles, time required to process data, etc.) associated with lookup functions that share an overlapping range in a data set. According to examples, when a first lookup function is processed in a spreadsheet application for a particular range (e.g., A1:A10000), and the data in the spreadsheet is sorted by a value type that is not the same as the value type of the lookup function range, a sorted index may be generated. For example, some users of spreadsheet applications may store a variety of value types in a spreadsheet (e.g., person names may be included in a first column, social security numbers may be included in a second column, birth dates may be included in a third column, etc.), and it may thus be impossible to sort all of the data in the spreadsheet at the same time.

Thus, according to aspects described herein where a VLOOKUP function is processed for a particular target value type (e.g., a name type, a social security number type, a date type), and the corresponding range specified in the VLOOKUP function for that value type is not sorted by the reference value type included in the lookup function, a sorted index may be generated that comprises the row numbers corresponding to the lookup range for the function, and those row numbers may be sorted according to the reference value in the lookup function. Alternatively, where an HLOOKUP function is processed for a particular target value type, and the corresponding range specified in the HLOOKUP function for that value type is not sorted by the reference value type included in that request, a sorted index may be generated that comprises the column numbers corresponding to the lookup range for the function, and those column numbers may be sorted according to the value type included in the range. Similarly, where a MATCH function is processed for a particular target value type, and the corresponding range specified in the MATCH function for the reference value type included in the request is not sorted by that value type, a sorted index may be generated that comprises the row or column numbers corresponding to the lookup range for the function, and those row or column numbers may be sorted according to the value type included in the range.

According to additional aspects, an index generated for a lookup function range may be sorted utilizing a binary search operation that is executed for each subsequent row or column number that is included in a given lookup range. That is, an index for a lookup function may be generated by inserting row or column numbers one-by-one into an index, and a determination may be made for each row or column number that is inserted as to a correct location for that row or column number in the index based on the value type that is included in the lookup range. A specific example of this process as applied to a VLOOKUP function is provided below.

In this specific example, if an index is being generated for rows 1, 2, 3 and 4 in a spreadsheet, row 1 may be inserted first, and as the index is currently empty, there is only one place to insert row 1. Thus, after insertion of row 1 into the index, the current index is:

Row 1

In determining a position for each subsequent row from the spreadsheet (row 2, row 3, row 4), a binary search is performed based on a value comparison between the row being inserted (e.g., first row 2, then row 3, then row 4). Thus, when row 2 is inserted into the index, a comparison is performed between the value corresponding to row 2, and the value in row 1, because row 1 has already been inserted in the index. If the value corresponding to row 2 is less than the value for row 1, row 2 is inserted before row 1 in the index. If the value corresponding to row 2 is more than the value for row 1, row 2 is inserted after row 1 in the index. For exemplary purposes, it will be assumed that the value for row 2 is more than the value for row 1, and thus row 2 would be inserted after row 1 in the index. Thus, the current index after insertion of row 1 and row 2 into the index is:

Row 1
Row 2

Next, when row 3 is being inserted into the index, the value corresponding to row 3 is compared against the row value for the current midpoint of the current index. If the binary search algorithm rounds up, the value for row 3 would be compared with the value corresponding to row 2 (the second row in the index). If the value corresponding to row 3 is more than the value for row 2, row 3 would be inserted after row 2 in the index. Alternatively, if the value corresponding to row 3 is lower than the value for row 2, the value corresponding to row 3 would be compared with the value for row 1. Again, if the value corresponding to row 3 is higher than the value for row 1, row 3 would be inserted in the index between row 1 and row 2. Alternatively, if the value corresponding to row 3 is lower than the value for row 1, row 3 would be inserted before row 1 in the index. Assuming for exemplary purposes that the value corresponding to row 3 is lower than the value for row 1, the current index after row 3's insertion is:

Row 3
Row 1
Row 2

Next, a position for row 4 in the index is determined through a binary search of the current index. That is, the value corresponding to row 4 is compared against the value for the current midpoint of the index. In this case, the midpoint is row 1, so the value corresponding to row 4 is compared against the value for row 1. If the value corresponding to row 4 is higher than the value for row 1, each row having corresponding values that are less than or equal to the value for row 1 are eliminated from the search (e.g., row 3 and row 1 are eliminated from the search), and the value corresponding to row 4 is then compared against a value corresponding to the midpoint row in the index that remains after elimination of row 3 and row 1. As there is only one row left in the index, row 2, the value corresponding to row 4 is compared with the value for row 2. If the value corresponding to row 4 is greater than the value for row 2, row 4 is inserted after row 2 in the index. Alternatively, if the value corresponding to row 4 is less than the value for row 2, row 4 is inserted just before row 2. Assuming for example purposes that the value for row 4 is greater than the value for row 2, the generated index would be:

Row 3
Row 1
Row 2
Row 4

According to some examples, the generated index for a given lookup function may only include row or column numbers sorted according to the value type for the lookup function's range. In such an example, as each row is being inserted during index generation, a call to the spreadsheet would need to be made to determine whether a value corresponding to a row that is currently being inserted is greater than or less than a value corresponding to a row midpoint value it is being compared to in the binary search utilized to position the row in the index. That is, as the row midpoint value in this scenario is not contained in the index, a call to the spreadsheet would need to be made to obtain that value, which the value corresponding to the row being inserted would be compared to.

In other examples, the generated index for a given lookup function may comprise row or column numbers sorted according to the value type for a lookup function's range, and the corresponding values for each cell in the range. In such examples, a call back to the spreadsheet to determine values for each midpoint row or column comparison performed in generating the index is not necessary, as those values are already included in the index being generated.

Upon generation of a sorted index corresponding to a range of a lookup function in a spreadsheet application, one or more computing devices associated with the spreadsheet application may perform a binary search to determine a row or column number associated with a reference value of the corresponding lookup function. In examples where a sorted index includes only sorted row or column numbers based on the value type of a corresponding lookup function range, a call back to a corresponding spreadsheet application instance may be performed to determine a value associated with a middle row or column number of the index that is being compared with a reference value. In other examples where a sorted index includes sorted row or column numbers based on the value type of a corresponding lookup function range, and values corresponding to each of the rows or column numbers, a binary search may be performed without a callback to a corresponding spreadsheet application instance. That is, a reference value associated with a lookup function may be compared to the values of midpoint rows or columns in a sorted index, without necessitating the additional step of calling back to a corresponding spreadsheet instance to determine the value for each midpoint row or column that is needed to perform the binary search of the sorted index.

A sorted index that has been generated in association with a corresponding range of a lookup function may be cached or otherwise saved for use in processing additional functions that incorporate an overlapping range. In some examples, a sorted index may be saved to a computing device running a corresponding spreadsheet application. In additional examples, a sorted index may be saved as part of a corresponding spreadsheet application file. In additional examples, a sorted index may be saved to a remote computing device. For example, if a corresponding spreadsheet application is a web-based spreadsheet application, a generated index for the web-based spreadsheet application may be saved to one or more server computing devices associated with implementing an instance of the web-based spreadsheet application from which the generated index was generated for.

When a lookup function calculation in a spreadsheet application is performed, a computing device associated with that function may first make a determination as to whether an index may have already been generated that includes an overlapping range with the range specified in the function. In order for a cached index to be utilized by a subsequent function based on an overlapping range being specified in the function, a determination is made as to whether the function for which the cached index was generated has the same starting cell range as the subsequent function. For example, if an index is generated and cached for a first VLOOKUP function in a spreadsheet that has a range of A1:A10, and a subsequent VLOOKUP or MATCH function being processed in the spreadsheet has a range of A1:A20, a binary search performed for the reference value of the subsequent function may reuse the cached index corresponding to the A1:A10 VLOOKUP function, and an additional sorted index corresponding to rows A11 to A20 may then only need to be created to identify the row number associated with the reference value of the subsequent function by performing a binary search if the subsequent reference value is not identified from the cached index corresponding to the first VLOOKUP function.

According to some aspects, a cached index for a lookup function in a spreadsheet application may be discarded each time a full worksheet calculation is completed in a spreadsheet application. In such examples, a sorted index may be re-generated when a corresponding lookup function is processed during a subsequent processing of that lookup function in the spreadsheet application. In alternate examples, a cached index for a lookup function in a spreadsheet application may be discarded only upon detecting that a value in a range of the lookup function for the spreadsheet application has been modified.

FIG. 1 is a schematic diagram illustrating an example distributed computing environment 100 for performing a fast search to identify one or more target values in a spreadsheet application. According to some examples, the fast search may comprise a binary search performed in association with one or more lookup functions in a spreadsheet application. In other examples, the fast search may comprise a hash search. In still other examples, the fast search may comprise a radix sort search. The exemplary distributed computing environment 100 includes first spreadsheet application environment 102, network environment 114, cache and processing environment 116, and second spreadsheet application environment 122.

The first spreadsheet application environment 102 includes user 104, computing device 106, and spreadsheet application 108. Spreadsheet application 108 may comprise an application running entirely on computing device 106 or spreadsheet application may be a web-based application that computing device 106 accesses via network 114. For example, computing device 106 may communicate, via network 114, with one or more server computing devices, such as server computing device 120, which may host a web-based spreadsheet that is implemented on computing device 106.

Spreadsheet application 108 may comprise a plurality of rows and a plurality of columns. In some examples, each of the plurality of columns or each of the plurality of rows may comprise a value type that is different from one or more other rows or columns in the spreadsheet application 108. In other words, each column or row in the spreadsheet application 108 may represent a unique type of data that one or more users, such as user 104, would like to have their data represented as within spreadsheet application 108. For example, each column or row in spreadsheet application 106 may represent data of a different value type comprising: an integer value type, a text value type, a currency value type, a real number value type, a date value type, a time value type, and a date and time value type. Further, user 104, may execute a sort operation on one or more columns or rows in spreadsheet application 108; however in performing the sort operation, it may not be possible to sort each column or row in spreadsheet application 108 by its corresponding value type. That is, if one column or row is sorted according to its value type, each other column or row may then be out of order with regard to its value type after the sort operation.

User 104 has input a VLOOKUP function 110 in cell D4 112 in spreadsheet application 108. Although not shown, the input VLOOKUP function 110 may include a range of cells in one or more columns in spreadsheet application 108 in which to look for a reference value specified by the VLOOKUP function 110. In examples where the range includes a plurality of cells which are not already sorted according to their value type, the spreadsheet application 108 may determine whether a cached index comprising one or more sorted row numbers that overlap with the range in the VLOOKUP function exists. In examples where such a cache is saved locally, computing device 106 may send a cache query to a local storage device on computing device 106. In examples where the cache is located on one or more remote computing devices, computing device 106 may send a cache query, via network 114, to one or more remote computing devices such as cache storage device 118.

If a cached index comprising a portion of the specified range in the VLOOKUP function does not already exist, a sorted index may be generated comprising the row numbers included in the VLOOKUP function range sorted by their corresponding values. For example, where the lookup range specified in the lookup function comprises a plurality of values of an integer value type, an index may be generated comprising the plurality of row numbers in the lookup range, sorted by their corresponding integer values. Similarly, where the lookup range specified in the lookup function comprises a plurality of values of a date value type, an index may be generated comprising the plurality of row numbers in the lookup range, sorted by their corresponding date values. The same is true regardless of the value type that is represented in the lookup range specified in the lookup function. According to additional examples, the sorted index may include not only the row numbers corresponding to the lookup range, but also the corresponding values associated with those row numbers, which may also be sorted according to their corresponding row numbers.

According to examples where spreadsheet application 108 is a local application residing on computing device 106, the sorting and indexing of data associated with a lookup function may be performed by computing device 106. According to other examples, where spreadsheet application 108 is a web-based spreadsheet application, the sorting and indexing of data associated with a lookup function may be performed by one or more remote computing devices, such as remote server computing device 130, which may communicate with computing device 106 via network 114.

Upon generation of a sorted index for a particular lookup function or a determination that a sorted index corresponding to a range specified in the lookup function exists, a binary search may be performed of the index to identify a reference value specified in the lookup function. For example, second spreadsheet application environment 122 includes user 124, computing device 126, spreadsheet application 128, and result 132 of VLOOKUP function 130. Each element included in second spreadsheet application environment 122 may be the same as the corresponding elements shown in relation to first spreadsheet application environment 102, except for result 132 corresponding to the reference value specified by VLOOKUP function 110 and VLOOKUP function 130.

FIG. 2 illustrates an exemplary lookup function 204 in a spreadsheet application 202 that may utilize the fast search mechanisms described herein for identifying one or more target values 208 in the spreadsheet application 202. The spreadsheet application 202 comprises a plurality of columns with a plurality of corresponding value types. Column A comprises a plurality of movies corresponding to a text value type, column B comprises a plurality of movie release years corresponding to an integer value type, column C comprises a plurality of movie release months corresponding to a date value type, column D comprises a plurality of movie rankings based on box office sales corresponding to an integer value type, and column E comprises a plurality of movie box office sales corresponding to a currency value type.

Spreadsheet application 202 is sorted according to the text value type of column A (i.e., column A is sorted alphabetically from A-Z). In sorting the information in spreadsheet application 202 according to the value type in column A, it can be seen that the information in each of columns B through E are not sorted according to their corresponding value types. For example, if column B were sorted according to its value type, 1987 in row 3 would precede 2001 in row 2, if column C were sorted according to its value type, Mar. in row 3 would precede Dec. in row 2, if column D were sorted according to its value type, 52 in row 4 would precede 675 in row 3, and if column E were sorted according to its value type, $22,248,500.00 in row 3 would precede $1,258,127,200.00 in row 2.

In this example, a user may wish to know the box office sales of a movie that they know is included in the spreadsheet application, based on a rank number that they know for that movie. In this case, the known rank number is shown at 212 corresponding to rank "327", and that rank number is input into cell I3. and in cell I4 214, next to the "Rank:" value shown in cell H4, the user has input the VLOOKUP function "=VLOOKUP(I3,D2:E9,2,FALSE)". In the lookup function, I3 is the known value, or reference value, (corresponding to "327" 212 in cell I3), which the user is utilizing to locate the target value based on the lookup range, or table array, "D2:E9", "2" is the column in which the reference value resides in (i.e., the second column in the range), and the "FALSE" designation provides that the user only wants exact matches corresponding to the reference value, not approximate matches. The entire VLOOKUP function can be shown at 204 in the spreadsheet application, corresponding to the value input in cell I4. In this example, because the column corresponding to the known value (i.e., 327), is not sorted according to its value type, a determination is made as to whether an index corresponding to the lookup range for the VLOOKUP function has already been cached. If no such cached index exists, then a new sorted index is created in order to perform a binary search for the reference value.

Figure 3:
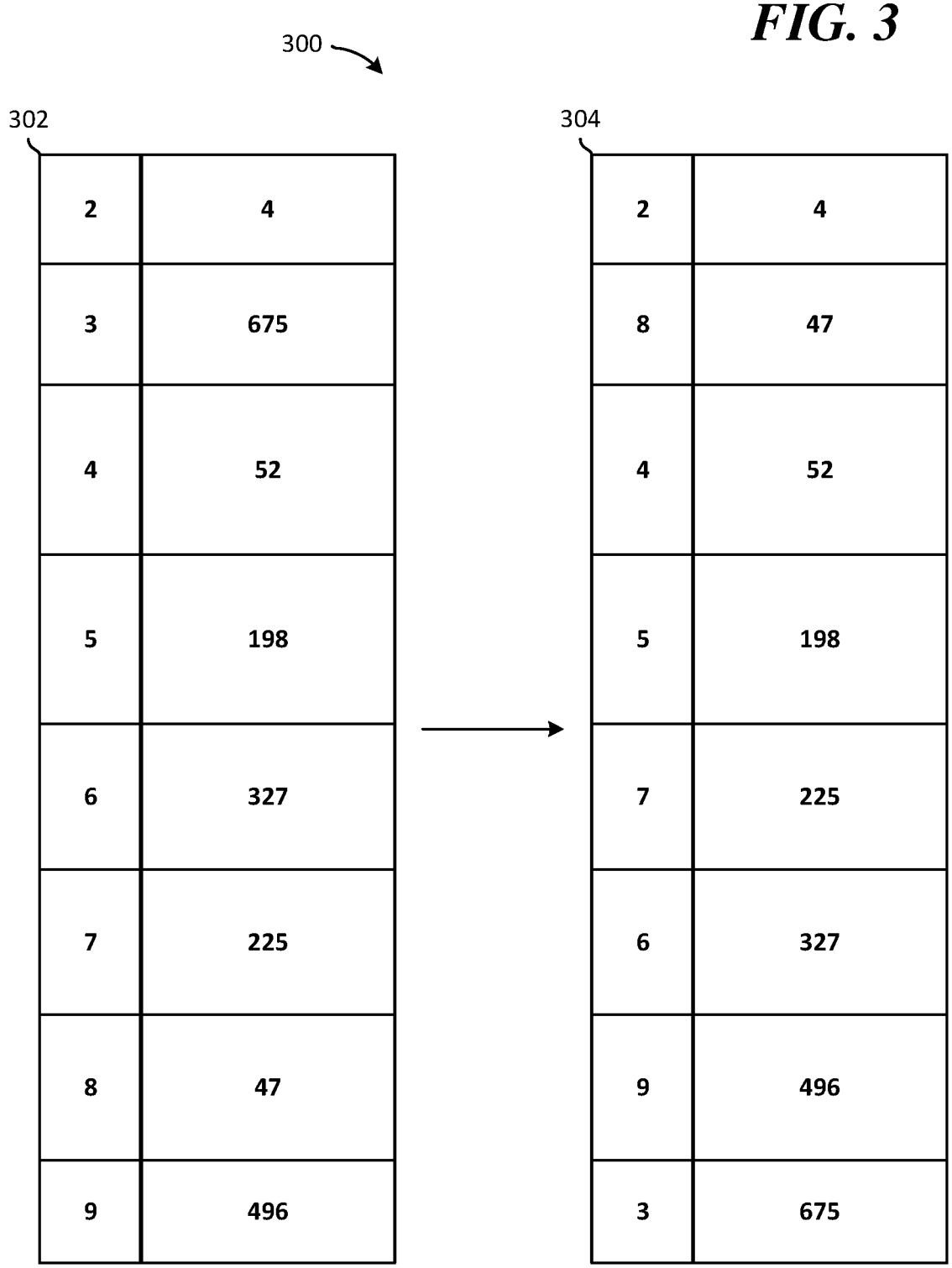
FIG. 3 illustrates index generation for a spreadsheet application data set that may be utilized by one or more lookup functions in the spreadsheet application to perform a fast search for one or more target values.

FIG. 3 illustrates index generation environment 300 for a spreadsheet application data set that may be utilized by one or more lookup functions in the spreadsheet application to perform a fast search for one or more target values. Specifically, index generation environment 300 includes unsorted index 302 and sorted index 304. Both of unsorted index 302 and sorted index 304 comprise values from column D and rows 2 through 9 in FIG. 2. However, unsorted index 302 shows the values in column D as sorted according to the textual values in column A in FIG. 2, while sorted index 304 shows the values in column D sorted according to the value type in column D (i.e., according to an integer value type). Thus, sorted index 304 depicts the generation of a sorted index based on the VLOOKUP function that has been input into the spreadsheet application of FIG. 2.

In some examples, sorted index 304 may include only the row numbers corresponding to column D being sorted by integer value type. In other examples, sorted index 304 may include the row numbers corresponding to column D being sorted by integer value type, and the corresponding values in each of the row numbers in column D.

Figure 4A:
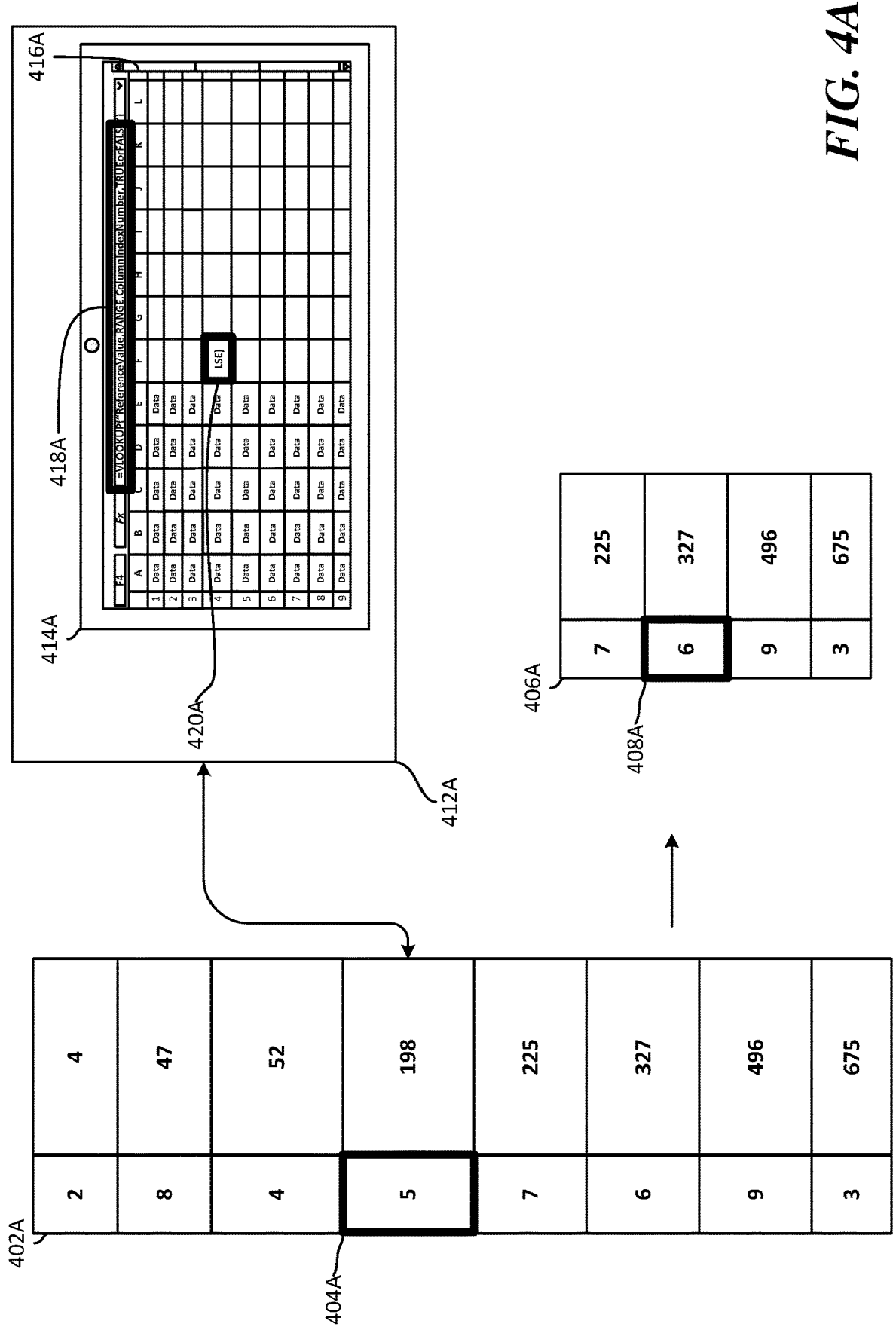
FIG. 4A illustrates mechanisms by which a fast search for a target value may be performed utilizing a generated index from a spreadsheet application.

FIG. 4A illustrates mechanisms by which a fast search for a target value may be performed utilizing a generated index 402A from a spreadsheet application 416A. In this example a VLOOKUP function is entered into cell F4 at 420A. The exemplary VLOOKUP function is also shown in the spreadsheet bar at 418A. In some examples, the fast search may comprise a binary search of the generated index 402A.

Generated index 402A includes each of the rows associated with column D in FIG. 2 sorted according to the value and value type designated in column D of FIG. 2 (i.e., integer value type). As such, generated index 402A includes the row numbers of column D sorted in ascending order according to their corresponding row values. In some examples, in addition to the row numbers, generated index 402A may also include the row values from column D in FIG. 2, also sorted according to their value type (i.e., integer value type).

In applying a binary search for the reference value associated with VLOOKUP function 418A input into cell 420A in spreadsheet application 416A, a first operation may be performed whereby the reference value is greater than or less than the middle value associated with the middle row number 404A in generated index 402A. In examples, the middle row number may be determined based on a round up operation. That is, where the number of rows represented in generated index 402A is an odd number, the middle row number may be determined by dividing the total number of rows and rounding up to nearest whole number (e.g., 9/2=4.5; rounded up to 5). However, as the number of rows represented in generated index 402A are an even number (i.e., 8) the middle row number may be determined by dividing the total number of rows in generated index 402A by two (e.g., 8/2=4). As such, the middle row number in generated index 402A is the fourth row down, which is row 5 in that sorted index. Upon determining what the middle row number in generated index 402A is (i.e., row 5), a comparison must be made as to whether the reference value (i.e., 327), is greater than or less than the value associated with the middle row number 404A (i.e., 198) of the generated index 402A. In this case, the reference value is greater than 198, so every row in generated index 402A with a corresponding value that is less than or equal to the value corresponding to the middle row number 404A in generated index 402A, can be eliminated from generated index 402A, and a new index 406A may be utilized in the next step of the binary search.

At the next step in the binary search, a determination must be made as to what row represents the middle row in the new index 406A. Because there is an even number of rows in new index 406A, the middle row number in new index 406A is calculated as (4/2=2, which is row 6 in new index 406A). Upon determining that row 6 408A is the middle row number of new index 406A, a determination is then made as to whether the reference value (i.e., 327), is equal to, or greater than or less than the value associated with the middle row number 408A of new index 406A. In this case the reference value equals the value associated with the middle row number 408A, as the middle row number has an associated value associated with it of 327. Thus, after only one cycle of elimination, the reference number 327 has been matched to its corresponding row value in the spreadsheet application 416A. Once the correct row number in the spreadsheet application 416A has been identified, a simple operation can be performed in the spreadsheet to obtain the target value in row 6. That is, the sales figure column in spreadsheet application can be analyzed at row 6, and a box office sales figure of $48,267,300.00 can be identified as corresponding to the movie in the spreadsheet application 416A with a rank of 327.

Figure 4B:
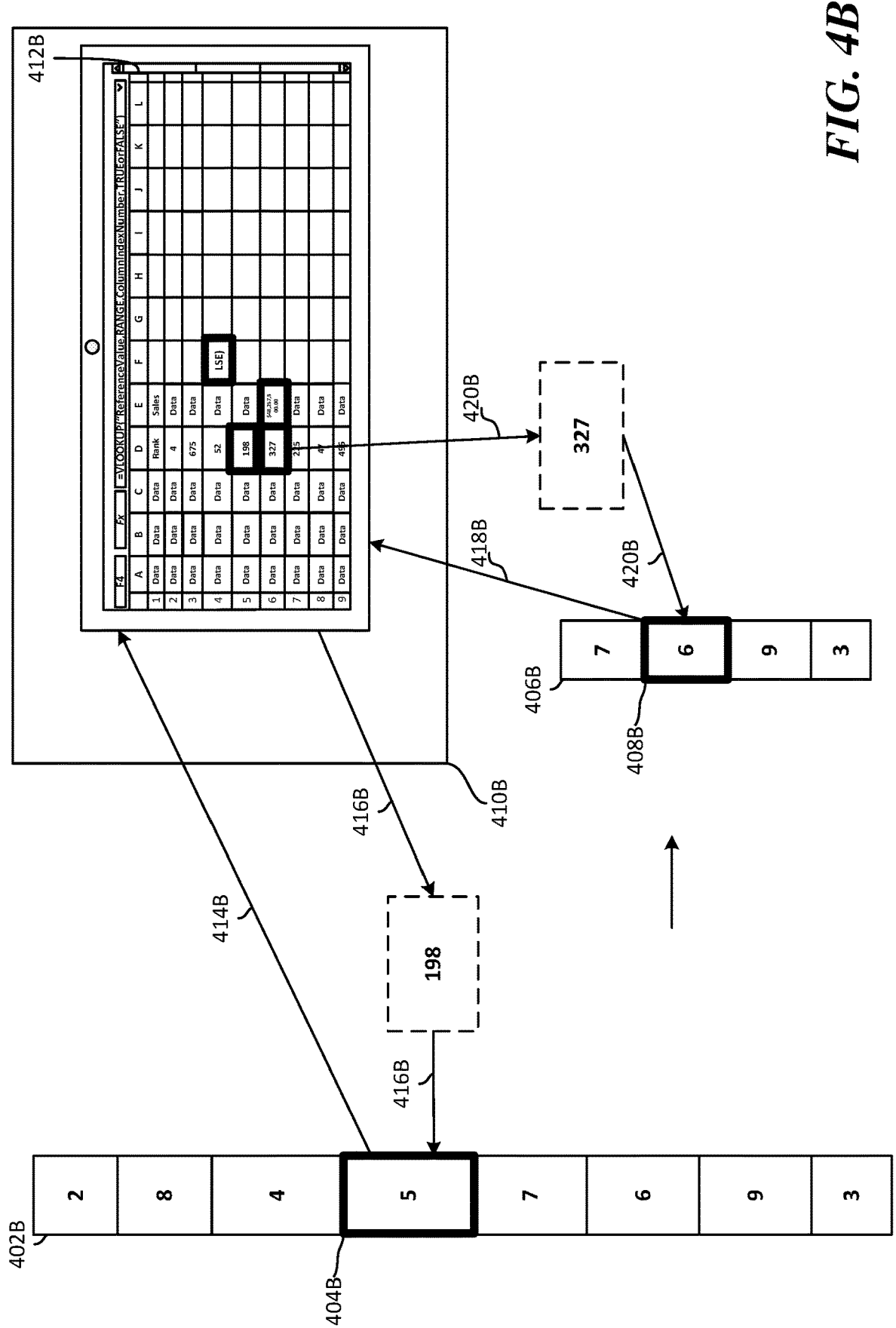
FIG. 4B illustrates additional mechanisms by which a fast search for a target value may be performed utilizing a generated index from a spreadsheet application.

According to examples where only the sorted row numbers are provided in sorted indexes 402A and 406A, in performing the binary search for the reference value and making the comparisons between the values associated with middle row numbers 404A and 408A, and the reference value specified in the lookup function, the sorted indexes 402A and 406A may make a call back to the spreadsheet application 416A in order to determine what the corresponding value is for each of those middle row numbers, as discussed more fully with regard to FIG. 4B. However, it should be understood that if the values for each row number are also included with the sorted row numbers, such an operation is not necessary in order to compare the middle row number value with the reference value from the lookup function.

FIG. 4B illustrates mechanisms by which a fast search for a target value may be performed utilizing a generated index 402B from a spreadsheet application 412B. The index 402B comprises a plurality of row numbers sorted according to the values and value types in column D of spreadsheet application 412B. In this example, column D comprises a plurality of movie rankings based on box office sales. The index 402B has been generated based on a VLOOKUP function being input into cell F4 of spreadsheet application 412B. Specifically, the VLOOKUP function may comprise "=VLOOKUP(327,D2:E9,2,FALSE)". In the lookup function, "327" is the reference number (i.e., the number that a user knows and that the user would like to locate a sales figure for [i.e., the target value]), "D2:E9" is the range in which the function will be applied, 2 is the column index number in which the data corresponding to the target value is to be located (in this case the box office sales for a movie with rank 327), and "FALSE" designates that the user only wants exact matches returned.

The row numbers in index 402B are sorted according to an integer value corresponding to rank numbers associated with the movies in spreadsheet application 412B. Index 402B is utilized to perform a binary search for the reference value—in this example "327". The first operation in performing the binary search is to determine the middle row number in index 402B. The middle row number of index 402B is determined by dividing the number of rows in index 402B by two. Because there are eight rows in index 402B (i.e., rows 2-9), corresponding to the range specified in the lookup function, the middle row is the 4th row down in index 402B (i.e., row 5 404B).

Upon determining that row 5 404B corresponds to the middle row in index 402B, a call 414B from index 402B to spreadsheet application 412B is made to determine the value corresponding to row 5 404B in the reference value column, which in this example corresponds to cell D5. The spreadsheet application 412B may send 416B the requested value back to index 402B. In this example, the value corresponding to cell D5 is 198. The value received by index 402B corresponding to its middle row (row 5 404B) is then compared against the reference value from the lookup function. Thus, a determination is made as to whether 198 (the value corresponding to row 5 404B) is greater than or equal to 327 (the reference value in the lookup function), or whether 198 (the value corresponding to row 5 404B) is less than or equal to 327 (the reference value in the lookup function).

In this example, the reference value is greater than the value corresponding to row 5 404B. As such, each value that is less than or equal to the value corresponding to row 5 404B may be discarded from the index 402B, and new index 406B may be generated. That is row numbers from row 5 404B and above in the index may be discarded from index 402B and new index 406B may be generated based on the remaining rows from index 402B. In this example, new index 406B comprises rows 7, 6, 9, and 3, sorted in ascending order according to an integer value type corresponding to the movie ranking values in spreadsheet application 412B.

Upon scaling the first sorted index 402B down based on comparison of the value corresponding to its middle row to the reference value in the lookup function, the next step is to identify the middle row number in new index 406B. In this example, there are four row numbers in new index 406B. Thus, the middle row number is determined by dividing the number of row numbers in new index 406B by two. Thus, the middle row number in new index 406B is the second row from the top row of new index 406B. That is, the middle row number in new index 406B is row 6 408B.

Upon determining that row 6 408B corresponds to the middle row in new index 406B, a call 418B from new index 406B to spreadsheet application 412B is made to determine the value corresponding to row 6 408B in the reference value column, which in this example corresponds to cell D6. The spreadsheet application 412B may send 420B the request value back to new index 406B. In this example, the value corresponding to cell D6 is 327. The value received by new index 406B corresponding to its middle row (row 6 408B) is then compared against the reference value from the lookup function. Thus a determination is made as to whether 327 (the value corresponding to row 6 408B) is greater than or equal to 327 (the reference value in the lookup function), or whether 327 (the value corresponding to row 6 408B) is less than or equal to 327 (the reference value in the lookup function).

In this example, a determination is made that the value corresponding to row 6 (327) is equal to the reference value in the lookup function (327). As such, one further operation may be performed to determine the target value of the lookup function. That is, a determination may be made by the spreadsheet application as to what value corresponds to the column index number provided in the lookup function at row 6. In this example, the cell corresponding to the column index number provided in the lookup function at row 6 is E6, and the value in that cell is a currency value corresponding to $48,267,300.00. Thus, the target value of $48,267,300.00, identified through a fast binary search of generated index 402B, may be caused to be displayed in association with the spreadsheet application 412B. Specifically, the target value of the lookup function of spreadsheet application 412B may be caused to be displayed in a cell where the lookup function was entered (i.e., cell F4).

Figure 5:
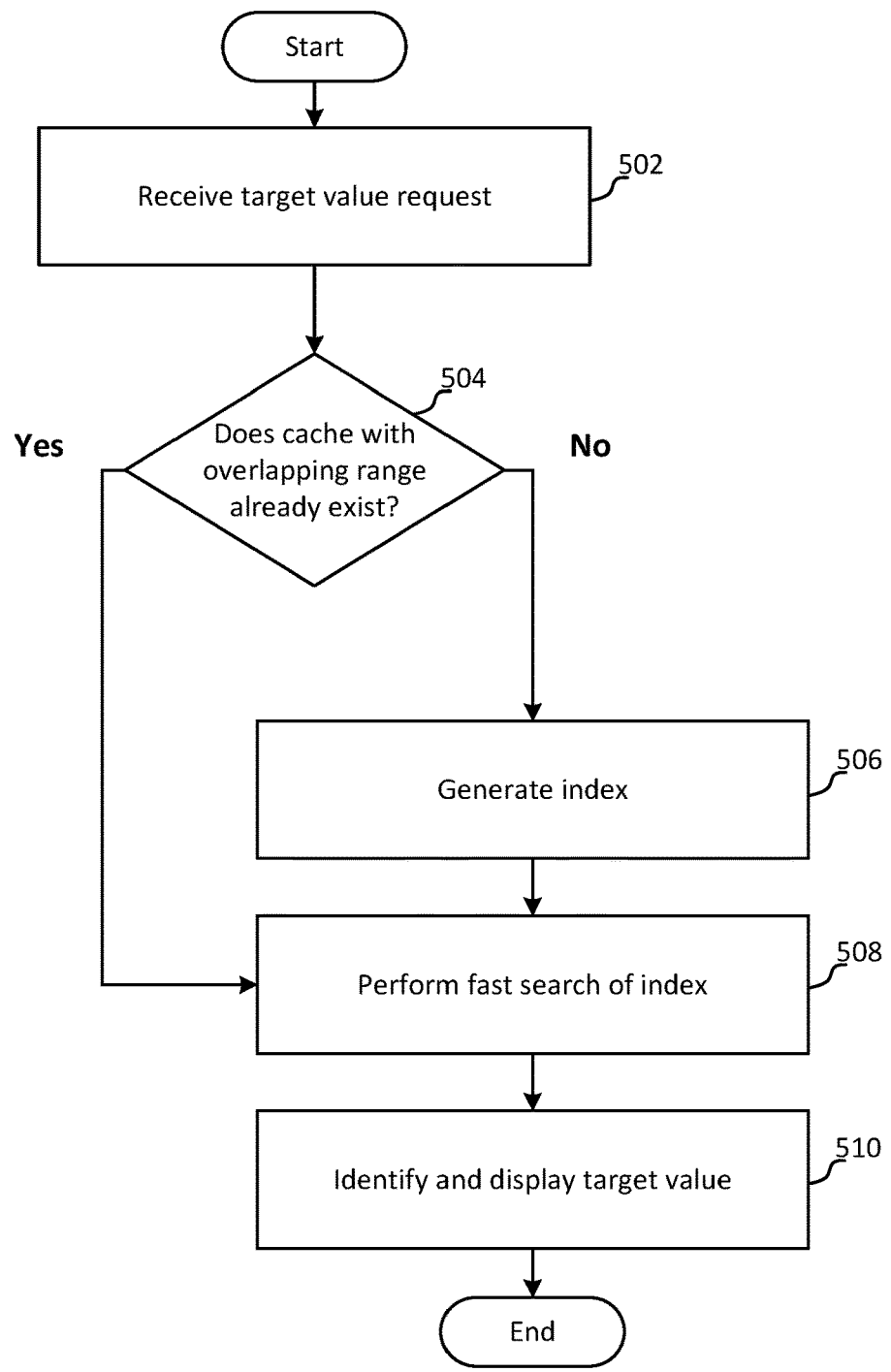
FIG. 5 is an exemplary method 500 for identifying a target value in a data set.

FIG. 5 is an exemplary method 500 for identifying a target value in a data set.

The method 500 begins at a start operation and flow moves to operation 502 where a target value request is received. In examples, the target value request may be comprised in a lookup function, such as a VLOOKUP function, an HLOOKUP function, or a MATCH function.

From operation 502 flow continues to operation 504, where a determination is made as to whether a cached index corresponding to the range specified in the target value request already exists. In examples, the determination as to whether a range specified in the target value request already exists comprises determining whether a cached index exists having a starting range value that is the same as the starting range value specified in the target value request. In additional examples, the determination as to whether the range specified in the target value request already exists may also comprise determining whether the new target value request comprises the same column or row number as a cached index (depending on the function/request type). In still other examples, the determination as to whether the range specified in the target value request already exists may also comprise determining whether the new target value request comprises the same reference number value type as a request from which a cached index was generated (i.e., whether the known value type in the functions is the same). For example if a cached index comprises a sorted index of rows A1:A10, and the target value request lookup function comprises a lookup range of A1:A20, the cached index may be utilized to perform a fast search of rows A1-A10 for the reference value included in the request. Thus, if a determination is made at operation 504, that a cached index exists having a starting range value that is the same as the starting range value specified in the target value request, flow continues to operation 508, where a fast search (e.g., a binary search) of the cached index may be performed to locate the row number corresponding to the reference value.

In the example above, if the reference value/row number cannot be identified based on a binary search of the cached index, then an index may be generated for rows A11:A20, and an additional binary search corresponding to the new index may be performed. Alternatively, if a reference value cannot be identified based on the initial binary search of the cached index, a systematic search of A11:A20, in their unsorted form as displayed in the spreadsheet application, may be performed to determine whether the reference value is located in any of cells A11:A20.

In examples where a determination is made at operation 504 that a cached index corresponding to the range specified in the target value request does not already exist, flow continues to operation 506 where a new sorted index may be generated for the range specified in the target value lookup request. According to some examples, the new sorted index may be generated based on a binary search performed for each row or column number that is to be inserted into the index. In some examples, the new sorted index may be cached upon its generation. The new sorted index may be cached to a local computing device on which a spreadsheet application is being run, or in examples where the spreadsheet application is a web-based application, the new sorted index may be cached on a remote computing device, such as a server computing device from which the web-based spreadsheet application is being run or otherwise communicated with. In examples where the new sorted index is cached to a local computing device on which the spreadsheet application is being run, the cached index may be saved to a workbook file of the spreadsheet application corresponding to the lookup function.

From operation 508, flow continues to operation 510, where the target value is identified and caused to be displayed based on the fast search performed at operation 508.

From operation 510 flow continues to an end operation, and the method 500 ends.

Figure 6:
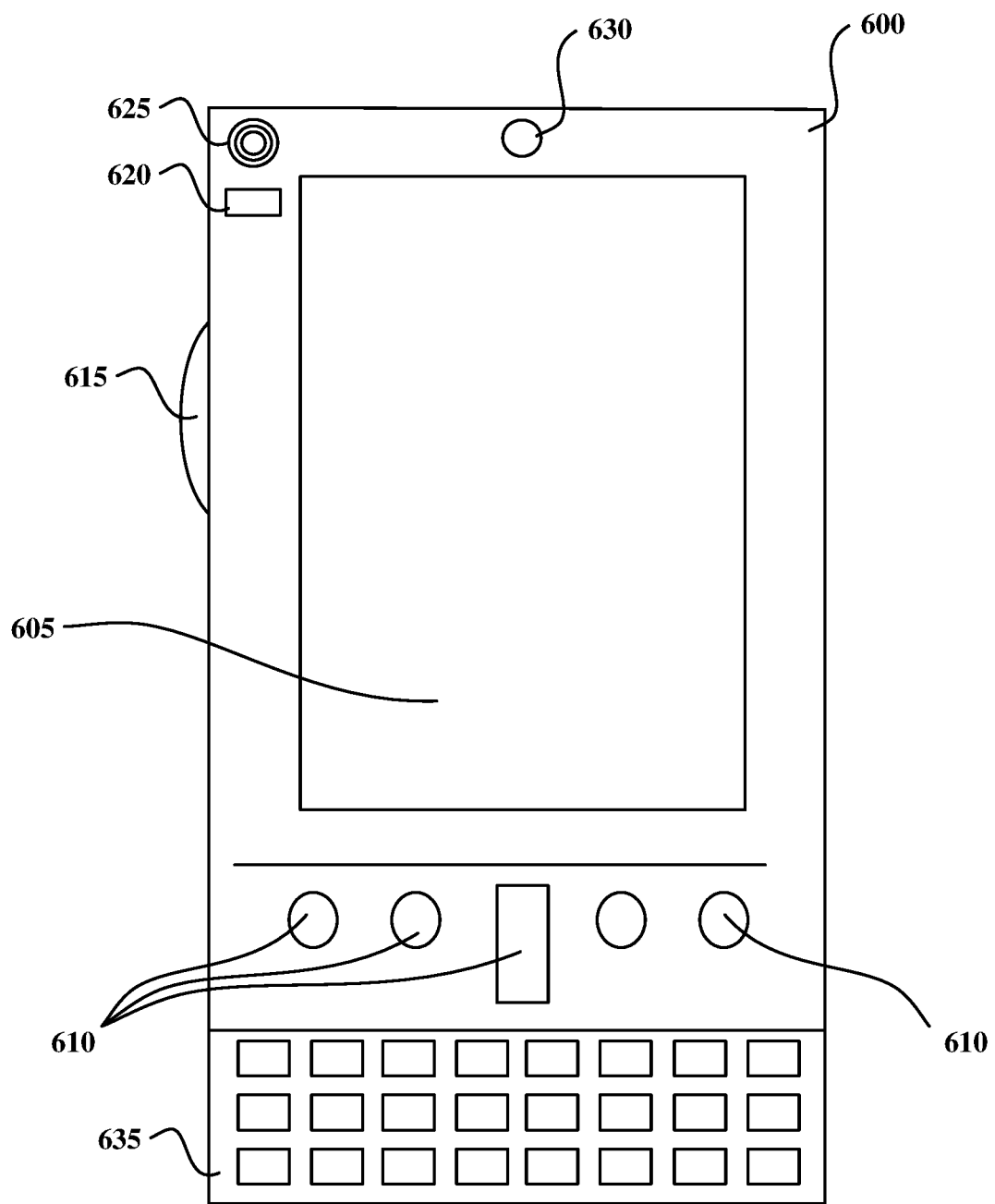
FIGS. 6 and 7 are simplified diagrams of a mobile computing device with which aspects of the disclosure may be practiced.
Figure 7:
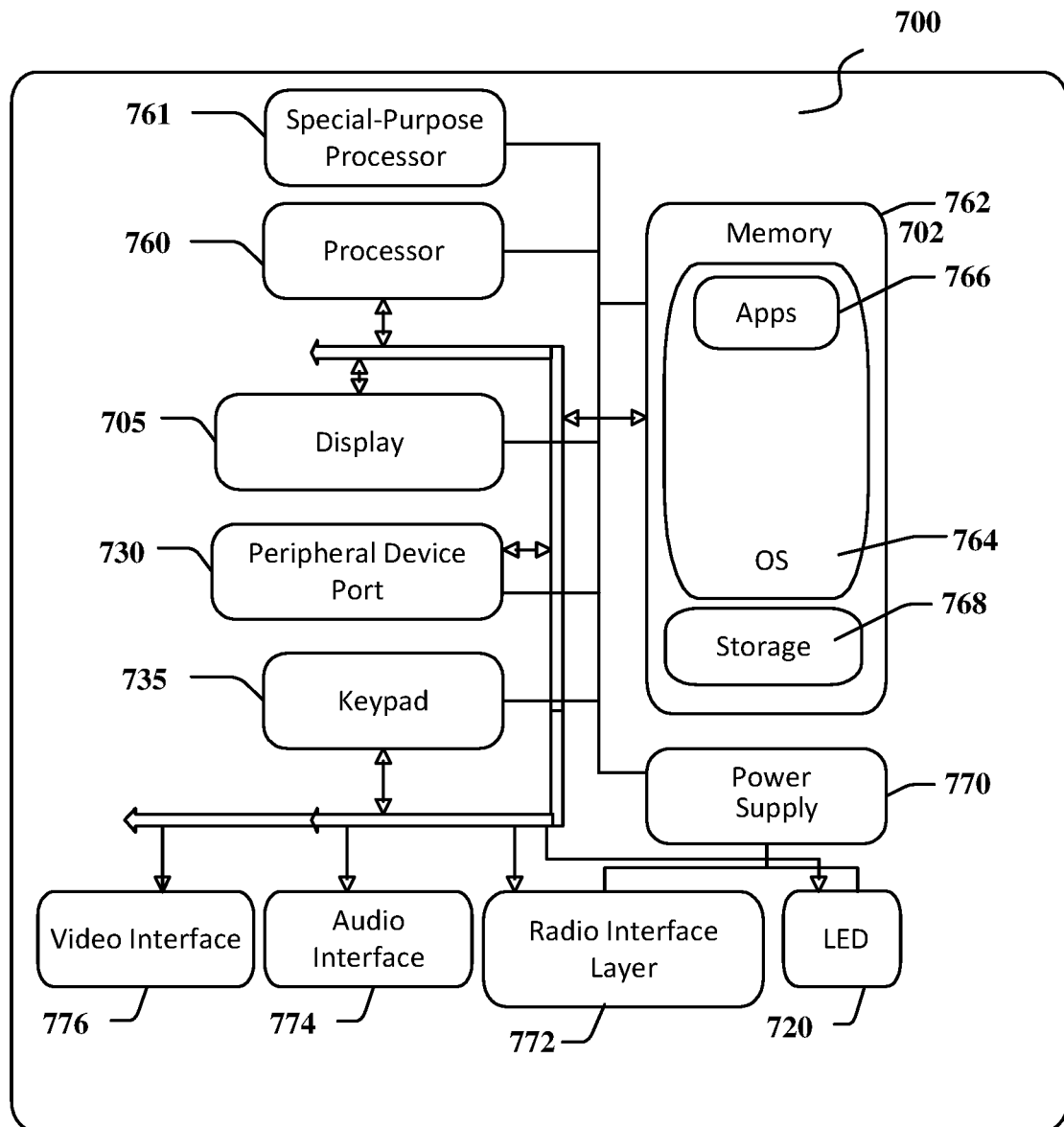

FIGS. 6 and 7 illustrate a mobile computing device 600, for example, a mobile telephone, a smart phone, wearable computer, a tablet computer, an e-reader, a laptop computer, and an augmented reality computer, with which embodiments of the disclosure may be practiced. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or fewer input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including instructions for identifying a target value in a data set.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 620 may be used to provide visual notifications, and/or an audio interface 774 may be used for producing audible notifications via the audio transducer 625. In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape.

Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
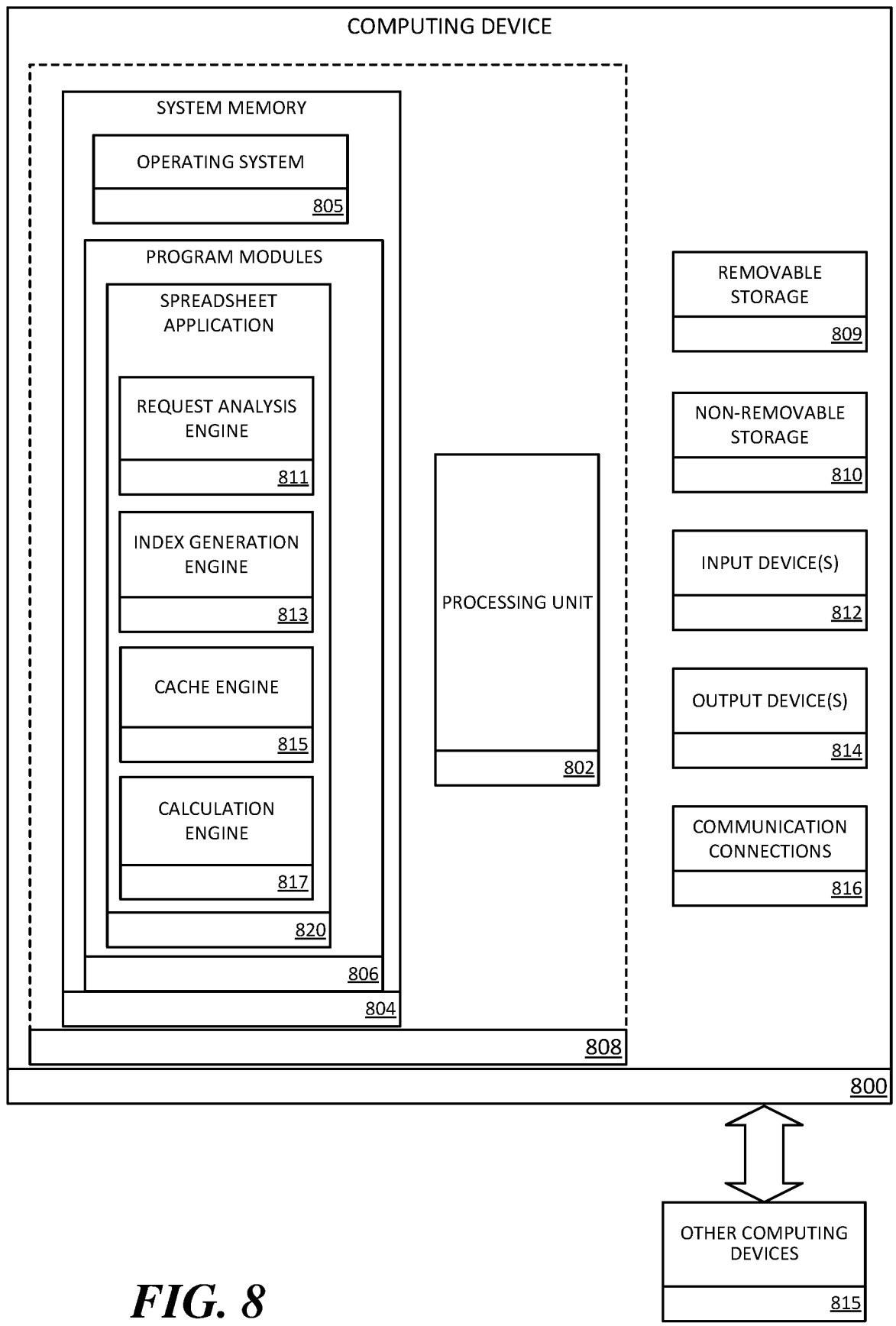
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for identifying a target value in a data set. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running one or more tree ensemble model optimization programs. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., spreadsheet application 820) may perform processes including, but not limited to, the aspects, as described herein. According to examples, the request analysis engine 811 may perform one or more operations associated with receiving a lookup function request, and determining a range associated with the lookup function request. The index generation engine 813 may perform one or more operations associated with generating a sorted index based on receiving a lookup function request, including performing a binary search for each subsequent row or column number that is to be inserted into a sorted index. The cache engine 815 may perform one or more operations associated with analyzing a cache to determine whether one or more sorted indexes correspond to a lookup range provided by a current lookup function that is being analyzed. Calculation engine 817 may perform one or more operations associated with performing function calculations, including utilizing intermediary values in such calculations from one or more cached indices generated from one or more previously analyzed functions of a spreadsheet application workbook.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 815. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
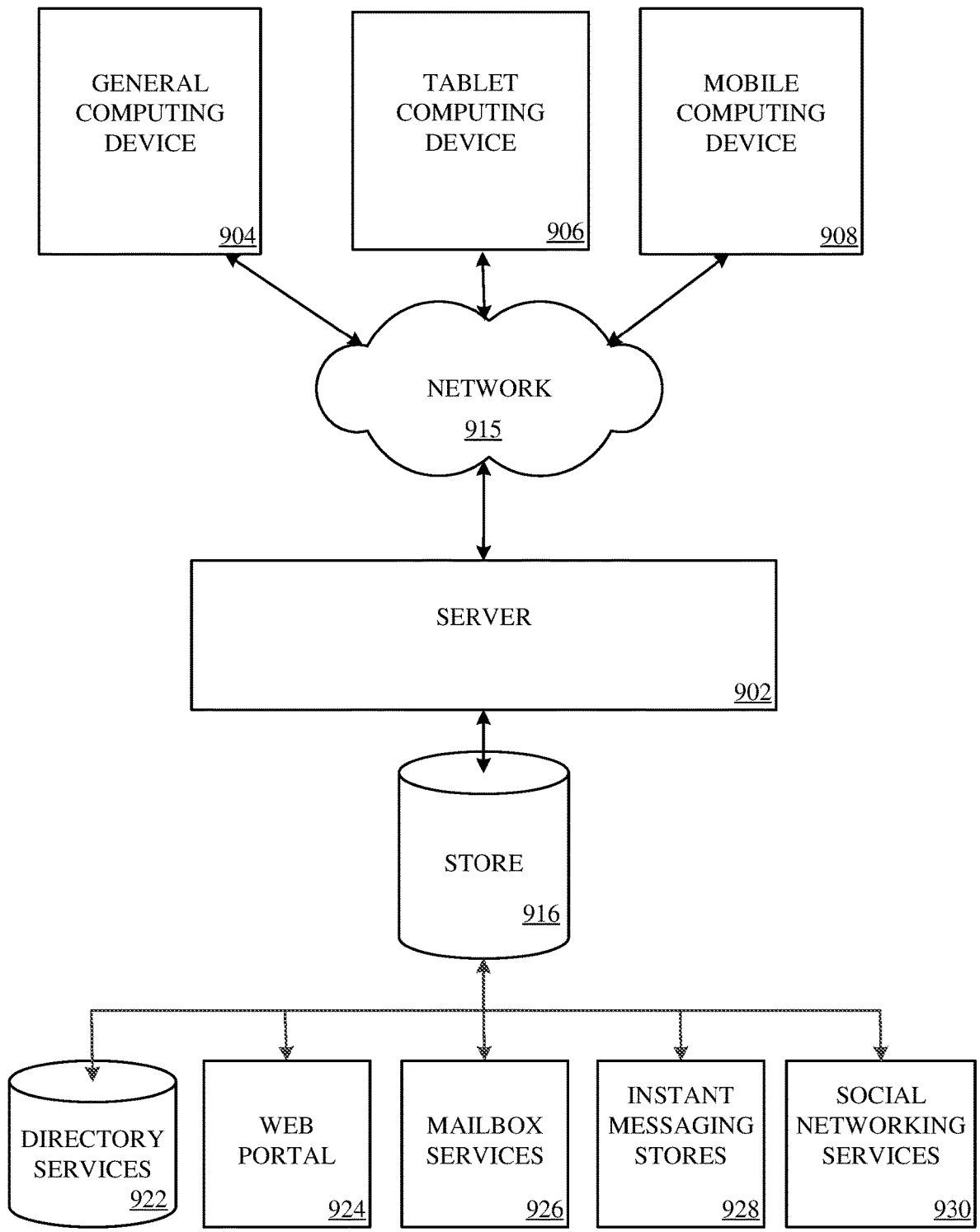
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The program modules 806 may be employed by a client that communicates with server device 902, and/or the program modules 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer system described above with respect to FIGS. 6-8 may be embodied in a personal/general computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for identifying a target value in a data set, the computer-implemented method comprising:
   displaying a data array;
   receiving a request for a first target value in the data array, the request including parameters specifying both:
      a reference value with a first value type, and
      a range of cells;
   determining that the displayed data array is sorted in a first order according to a second value type;
   generating in memory, while maintaining the displayed data array in the first order, an index comprising a plurality of row numbers from the data array corresponding to the range of cells included in the request, wherein the index has a same quantity of row numbers as a quantity corresponding to the range of cells included in the request;
   sorting the plurality of row numbers in the index by a corresponding value of the first value type in the data array;
   searching the sorted index for the reference value to locate a row number in the data array corresponding to the reference value in the data array;
   identifying the first target value in the data array based on the row number corresponding to the reference value; and
   visually emphasizing the first target value in the displayed data array.

2. The computer-implemented method of claim 1, wherein the data array comprises a plurality of values and a plurality of value types included in one or more tables in a spreadsheet application.

3. The computer-implemented method of claim 2, further comprising causing the identified first target value to be displayed in a cell of the spreadsheet application corresponding to the request.

4. The computer-implemented method of claim 2, wherein the plurality of value types are selected from: an integer value type, a text value type, a currency value type, a real number value type, a date value type, a time value type, and a date and time value type.

5. The computer-implemented method of claim 1, wherein searching the sorted index comprises performing a binary search of the index.

6. The computer-implemented method of claim 5, wherein performing the binary search of the index further comprises:
   identifying a plurality of values in the data array based on a corresponding reference number in the index; and
   comparing each of the identified values to the reference value.

7. The computer-implemented method of claim 5, wherein the index further comprises the plurality of values in the data array corresponding to each of the plurality of sorted reference numbers.

8. The computer-implemented method of claim 7, wherein performing the binary search of the index further comprises comparing at least one of the values in the index to the reference value based on a rank of the at least one value in the index.

9. The computer-implemented method of claim 1, further comprising:
   caching the index;
   receiving a request for a second target value from a second spreadsheet application function, the request for the second target value comprising a second reference value of the same value type as the first reference value and a range of cells in the data array to search for the second reference value;
performing a binary search of the cached index for the second reference value;
identifying the second reference value based on the binary search; and
identifying, based on the identification of the second reference value, the second target value.

10. The computer-implemented method of claim 9, wherein the request for the second target value is an automated request generated based on a table recalculation request from a spreadsheet application.

11. The computer-implemented method of claim 10, wherein the binary search of the cached index is performed, based at least in part, on a first cell in the range of cells specified in the request for the second target value being the same as a first cell in the range of cells specified in the request for the first target value.

12. The computer-implemented method of claim 1, wherein generating the index comprises:
performing a binary search of the index when each of the plurality of row numbers is inserted into the index during its generation; and
identifying, based on the binary search, a rank position in the index for each of the plurality of row numbers based on their corresponding values.

13. A system for identifying a target value in a data set, the system comprising:
a memory for storing executable program code; and
one or more processors, functionally coupled to the memory, the one or more processors being responsive to computer-executable instructions contained in the program code and operative to:
display a data array;
receive a request for a first target value in the data array, the request including parameters specifying both:
a reference value with a first value type, and
a range of cells;
determine that the displayed data array is sorted in a first order according to a second value type;
generate in memory, while maintaining the displayed data array in the first order, an index comprising a plurality of row numbers from the data array corresponding to the range of cells included in the request, wherein the index has a same quantity of row numbers as a quantity corresponding to the range of cells included in the request;
sort the plurality of row numbers in the index by a corresponding value of the first value type in the data array;
search the sorted index for the reference value to locate a row number in the data array corresponding to the reference value in the data array;
identify the first target value in the data array based on the row number corresponding to the reference value; and
visually emphasizing the first target value in the displayed data array.

14. The system of claim 13, wherein the one or more processors are further responsive to the computer-executable instructions contained in the program code and operative to:
cache the index;
receive a request for a second target value, the request for the second target value comprising a second reference value of the same value type as the first reference value and a range of cells to search for the second reference value;

perform a binary search of the cached index for the second reference value;
identify the second reference value based on the binary search;
identify, based on the identification of the second reference value, the second target value; and
cause the second target value to be displayed.

15. The system of claim 14, wherein the request for the second target value is automatically requested based on a function that applies the first target value in the function's calculation.

16. A computer-readable storage device comprising executable instructions that, when executed by one or more processors, assists with identifying requested information from data represented in a spreadsheet application, the computer-readable storage device including instructions executable by the one or more processors for:
displaying a data array;
receiving a request for a first target value in the data array, the request including parameters specifying both:
a reference value with a first value type, and
a range of cells;
determining that the displayed data array is sorted in a first order according to a second value type;
generating in memory, while maintaining the displayed data array in the first order, an index comprising a plurality of row numbers from the data array corresponding to the range of cells included in the request, wherein the index has a same quantity of row numbers as a quantity corresponding to the range of cells included in the request;
sorting the plurality of row numbers in the index by a corresponding value of the first value type in the data array;
searching the sorted index for the reference value to locate a row number in the data array corresponding to the reference value in the data array;
identifying the first target value in the data array based on the row number corresponding to the reference value; and
visually emphasizing the first target value in the displayed data array.

17. The computer-readable storage device of claim 16, wherein the instructions are further executable by the one or more processors for:
caching the index;
receiving a request for a second target value, the request for the second target value comprising a second reference value of the same value type as the first reference value and a range of cells in the spreadsheet application to search for the second reference value;
performing a binary search of the cached index for the second reference value;
identifying the second reference value based on the binary search; and
identifying, based on the identification of the second reference value, the second target value.

18. The computer-readable storage device of claim 17, wherein the request for the second target value is automatically requested based on a lookup function in the spreadsheet application.

19. The computer-readable storage device of claim 16, wherein the data array comprises a plurality of values and a plurality of value types included in one or more tables in the spreadsheet application.

20. The computer-readable storage device of claim 16, wherein the instructions are further executable by the one or more processors for:
   causing the identified first target value to be displayed in a cell of the spreadsheet application corresponding to the request.

* * * * *